June 21, 1949.    D. N. MATHEY    2,473,763
HOLDER ATTACHMENT FOR WAGONS
Filed June 4, 1947    2 Sheets-Sheet 1

Inventor
Donald N. Mathey

June 21, 1949.  D. N. MATHEY  2,473,763
HOLDER ATTACHMENT FOR WAGONS
Filed June 4, 1947  2 Sheets-Sheet 2

Inventor
Donald N. Mathey

By *Clarence A. O'Brien
and Harvey B. Jacobson*
Attorneys

Patented June 21, 1949

2,473,763

UNITED STATES PATENT OFFICE 2,473,763

HOLDER ATTACHMENT FOR WAGONS

Donald N. Mathey, Platte, S. Dak.

Application June 4, 1947, Serial No. 752,552

2 Claims. (Cl. 280—143)

This invention relates to new and useful improvements in shock absorbers and the primary object of the present invention is to provide a bolster attachment for wagons and the like so designed as to permit the wagon to be driven over rough terrain in a smooth manner without shock when the wagon is empty or carrying a very light load.

Another important object of the present invention is to provide a shock absorber that is quickly and readily applied to the axle of a wagon or the like, to eliminate the usual uncomfortable riding of the vehicle when unloaded.

A further object of the present invention is to provide a device for the described purposes that embodies novel and improved spring means that are particularly designed to function in removing shock from the vehicle when the same is unloaded.

A still further aim of the present invention is to provide a shock absorber of simple and practical construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is an enlarged longitudinal vertical sectional view taken substantially on the plane of section line 4—4 of Figure 1.

Figure 1:
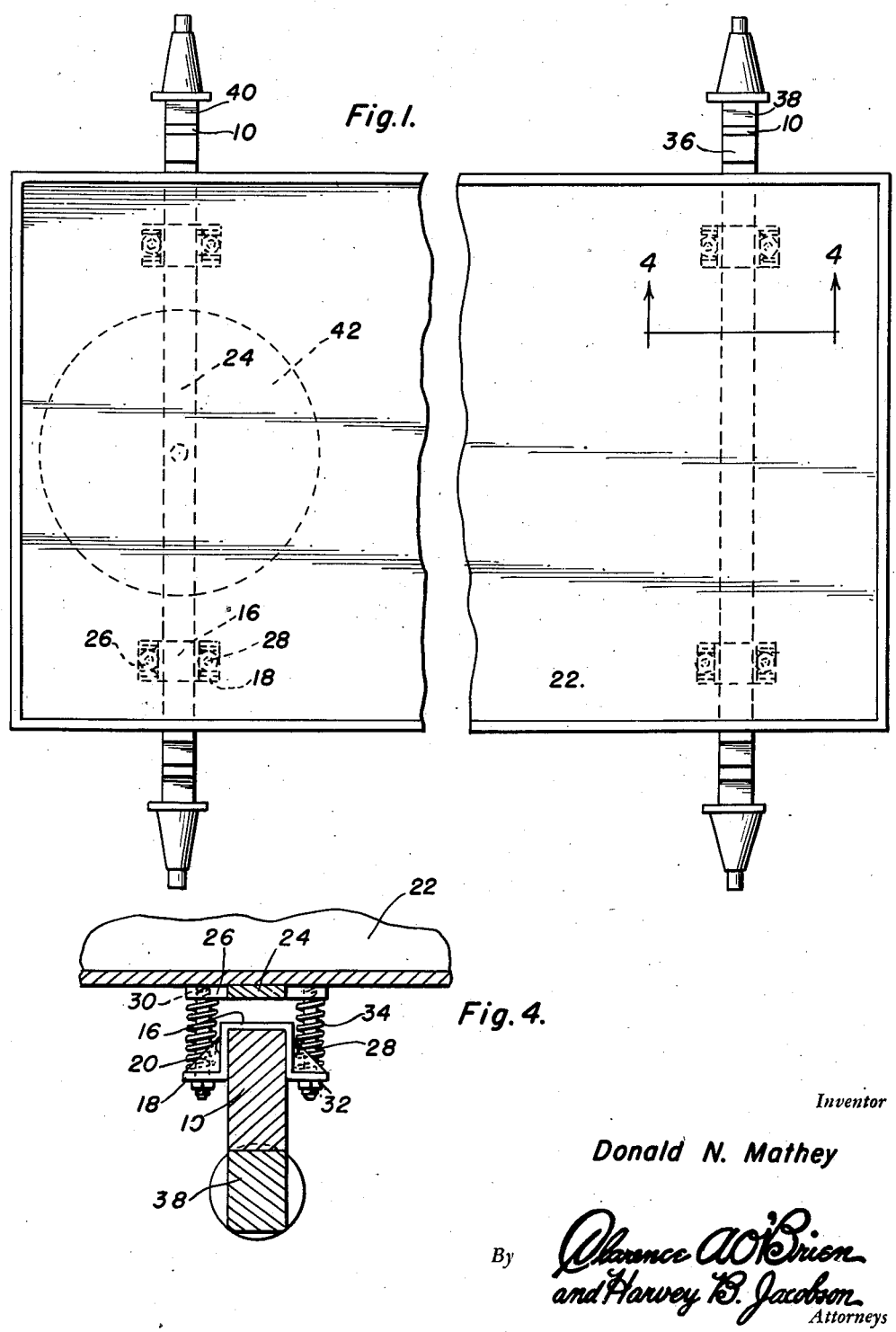
Figure 1 is a fragmentary top plan view showing the device applied to the axle of a wagon and beneath the wagon bed.
Figure 2:
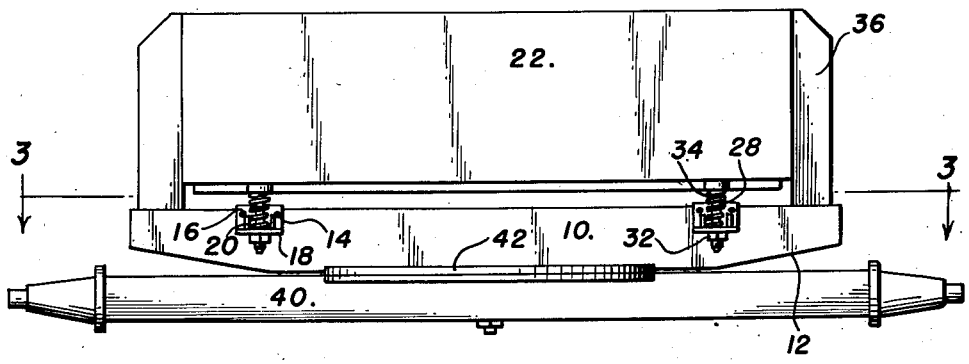
Figure 2 is a front elevational view of Figure 1.
Figure 3:
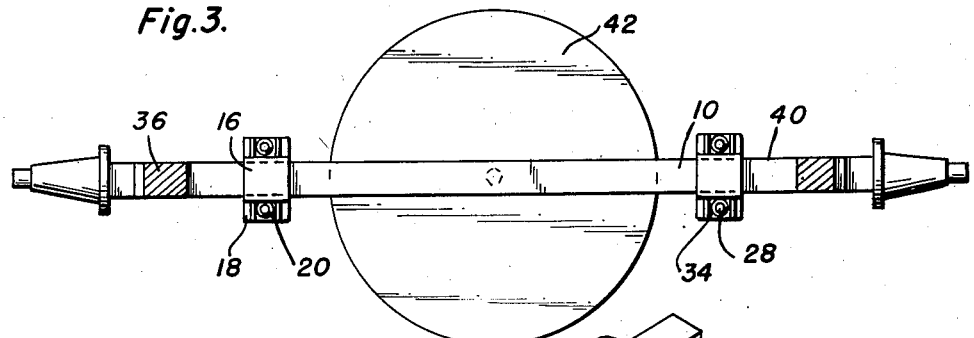
Figure 3 is a transverse vertical sectional view taken substantially on the plane of section line 3—3 of Figure 2.
Figure 5:
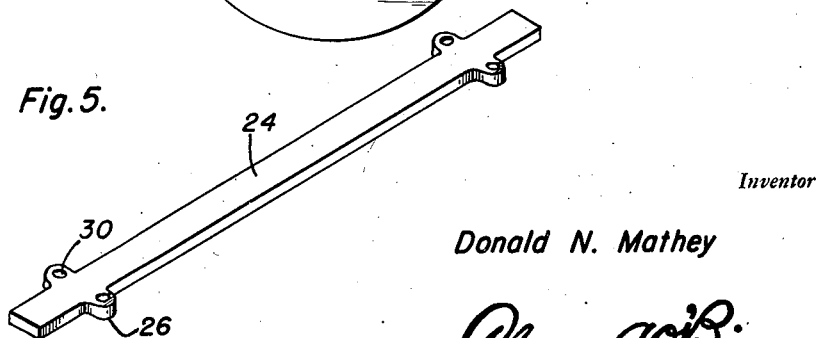
Figure 5 is a perspective view of the bearing plate used in conjunction with the present invention.

Referring now to the drawings in detail, wherein, for the purpose of illustration, there is disclosed a preferred embodiment of the present invention, the numeral 10 represents an elongated bolster bar having the terminal portions of its underside preferably inclined, as at 12, to limit the bearing portion of the bar on a wagon axle.

Intermediate the terminal portions of the bar 10 and removably secured thereto by fasteners 14 are substantially channel-shaped brackets 16 that embrace the upper portion of the bar. The ends 18 of these brackets are turned outwardly substantially horizontal and are retained in this fixed position by angle braces 20 secured to the ends 18 and the bar-engaging portion of the brackets.

Disposed above the bolster 10 and beneath the wagon bed 22 is an elongated bearing plate 24 having ears 26 projecting outwardly from its longitudinal sides that are disposed above ends 18.

Shafts or bolts 28 extend between the ears 26, and the out-turned ends 18 of the brackets, with the screw-threaded terminal portion at one end of these bolts engaging internally threaded apertures 30 provided in ears 26, and the other screw-threaded terminal portions of these bolts engageably receiving a nut or the like 32 disposed beneath ends 18 to permit movement of the plate 24 toward the bolster bar, but limiting spreading movement of the plate 24 relative to the bolster bar. Coil springs 34 are loosely mounted on the shaft 28 and extend between ears 26 of the bearing plate and the ends 18 of the brackets.

In practical use of the device, the upstanding posts 36 limiting transverse movement of the wagon bed 22 are secured to the terminal portion of the bolster bars that extend outwardly past the sides of the wagon bed.

One bolster bar and its component parts is removably secured to the rear axle 38 of the wagon in any suitable manner, and a similar bolster and its component parts is pivotally secured to the forward or front axle 40 of the wagon. As the front axle is constructed to turn for guiding the wagon, a pair of preferably circular bearing plates 42 are disposed between the lower face of the bolster and the front axle, whereby the front axle may turn without causing a turning action of the wagon bed.

When the wagon bed is loaded, the bearing plates 24 will be forced downwardly against the brackets 16 to afford only a slight means for absorbing the shock of the wagon in movement, but as the load is removed from the wagon bed, the springs will have a greater recoil action to remove the larger portion of the shock as the wagon passes over a rough terrain.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A shock absorber comprising a bolster member carried by a wagon axle, spring supporting brackets carried by said member intermediate the ends thereof, a bearing plate disposed above said member and beneath a wagon bed, ears projecting outwardly from said plate intermediate the ends thereof, shaft means engaging said ears and depending therefrom, the ends of said brackets turned outwardly to receive the free ends of said shaft means, and spring means carried by said shaft means and interposed between said ears and said brackets.

2. A shock absorber for wagons comprising a bolster member carried by a wagon axle, channel-shaped supports embracing the upper portion of said member adjacent each end thereof, the leg portions of said channel-shaped supports being turned outwardly to provide horizontal extensions, an elongated bearing plate aligning said member and disposed beneath a wagon bed, ears projecting outwardly from said bearing plate adjacent the ends thereof, said ears registering with the horizontal extensions, adjustable fasteners connecting the ears to the horizontal extensions, and springs embracing the fasteners and biased between the ears and the horizontal extensions.

DONALD N. MATHEY.

REFERENCES CITED

The following references are of record in the file of this patent:

UNITED STATES PATENTS

| Number | Name | Date |
|---|---|---|
| 1,398,810 | Story | Nov. 29, 1921 |
| 1,418,758 | Watkins | June 6, 1922 |
| 1,610,037 | Canevaro | Dec. 7, 1926 |
| 2,092,046 | Bixler | Sept. 7, 1937 |

FOREIGN PATENTS

| Number | Country | Date |
|---|---|---|
| 665,485 | Germany | Sept. 27, 1938 |